United States Patent
Schott (10) Patent No.: US 12,435,855 B2
(45) Date of Patent: Oct. 7, 2025

(54) OPTICAL DEVICE FOR A LIGHT SIGNAL LAMP COMPRISING A TRANSPARENT BLOCK OF MATERIAL WITH AN OGIVE SHAPED LIGHT OUTPUT PORTION

(71) Applicant: VIGNAL SYSTEMS, Corbas (FR)

(72) Inventor: Vivien Schott, Pont-Eveque (FR)

(73) Assignee: VIGNAL SYSTEMS, Corbas (FR)

( * ) Notice: Subject to any disclaimer, the term of this patent is extended or adjusted under 35 U.S.C. 154(b) by 0 days.

(21) Appl. No.: 18/770,354

(22) Filed: Jul. 11, 2024

(65) Prior Publication Data

US 2025/0027630 A1     Jan. 23, 2025

(30) Foreign Application Priority Data

Jul. 19, 2023  (FR) ...................................... 23/07745

(51) Int. Cl.
*F21S 43/236*  (2018.01)
*F21S 43/20*   (2018.01)
*F21S 43/243*  (2018.01)

(52) U.S. Cl.
CPC .......... *F21S 43/236* (2018.01); *F21S 43/243* (2018.01); *F21S 43/26231* (2024.05); *F21S 43/265* (2024.05)

(58) Field of Classification Search
CPC ... F21W 2103/30; F21S 43/241; F21S 43/236
See application file for complete search history.

(56) References Cited

U.S. PATENT DOCUMENTS 9,456,115 B2 * 9/2016 Sato ......................... G03B 5/04

FOREIGN PATENT DOCUMENTS

| CN | 208295826 U    | 12/2018 |
| DE | 102021100905 A1| 3/2022  |
| JP | 2014038733 A   | 2/2014  |
| JP | 2021118028 A   | 8/2021  |
| WO | 2020147515 A1  | 7/2020  |

OTHER PUBLICATIONS

French Search Report for FR Application No. 2307745; Mailing Date, Jan. 26, 2024.
Written Opinion for FR Application No. 2307745; Mailing Date, Jan. 26, 2024.

* cited by examiner

*Primary Examiner* — Robert J May
(74) *Attorney, Agent, or Firm* — CANTOR COLBURN LLP

(57) ABSTRACT

The optical device is intended to be placed in a housing to form a light signal lamp for a vehicle. The optical device includes, along the longitudinal direction: an input portion receiving rays emitted by a light source; a middle portion having two lateral faces spaced from each other along a transverse direction; an output portion including an output face through which the rays which have propagated in the optical device are emitted. The output portion comprises at least one module having lateral faces which, when viewed in the elevation direction, have an ogive shape and which define a front ridge extending substantially in a plane parallel to a plane.

19 Claims, 7 Drawing Sheets

OPTICAL DEVICE FOR A LIGHT SIGNAL LAMP COMPRISING A TRANSPARENT BLOCK OF MATERIAL WITH AN OGIVE SHAPED LIGHT OUTPUT PORTION

CROSS REFERENCE TO RELATED APPLICATIONS

This application claims priority under 35 U.S.C. § 119 to the following French Patent Application No. 23/07745, filed on Jul. 19, 2023, the entire contents of which are incorporated herein by reference thereto.

TECHNICAL FIELD

The present disclosure concerns an optical device intended to be placed in a housing to form a light signal lamp for a vehicle. The present disclosure also concerns a light signal lamp comprising such an optical device, and a vehicle, such as a truck or another industrial vehicle comprising such a lamp.

BACKGROUND

The trucks—or other industrial vehicles—have large dimensions and are also powerful vehicles. It is therefore essential, for questions of safety of goods and people, that they are clearly visible, day and night, and that their dimensions are clearly appreciated.

To do this, this type of vehicle is conventionally equipped with outline marker lamps, or clearance lamps. These are mounted in various locations of the vehicle to signal its position through emitting light rays.

Such a lamp typically comprises a base fastened to the vehicle and a transparent cover which is mounted on the base and forms an enclosure. This enclosure contains at least one light source as well as one or more optical devices aimed at directing the emitted light rays in the directions desired or required by regulations.

In practice, it may be difficult to reconcile the constraints of mechanical mounting, electrical connection, desired aesthetics, and regulations in terms of light distribution and intensity.

The present disclosure aims to provide a lamp having improved optical properties and whose bulk and mounting constraints remain under control.

BRIEF SUMMARY

For this purpose, and according to a first aspect, the present disclosure concerns an optical device intended to be placed in a housing to form a light signal lamp for a vehicle. The optical device is in the form of a block of transparent or translucent material having a longitudinal direction and comprising, along the longitudinal direction:
- an input portion configured to receive rays emitted by at least one light source;
- a middle portion having two lateral faces spaced from each other along a transverse direction orthogonal to the longitudinal direction;
- an output portion including an output face through which the rays which have propagated in the optical device are emitted;
- an elevation direction being defined as orthogonal to the longitudinal and transverse directions.

According to a general definition of the present disclosure, the output portion comprises at least one module having lateral faces which, when viewed in the elevation direction, have an ogive shape and which define a front ridge extending substantially in a plane parallel to the longitudinal and elevation directions.

Thanks to this specific shape of the output portion, the light beam obtained at the output of the optical device has, in a plane orthogonal to the elevation direction, an angular amplitude greater than what may be obtained with conventional shapes. Indeed, beyond a certain angle of incidence with the lateral face, a light ray propagating in the optical device is not transmitted but on the contrary reflected, thus being returned inside the optical device. The ogive shape makes it possible both to transmit more light rays towards the outside of the optical device, and to direct these rays emitted according to a cone of greater angle, in a plane orthogonal to the elevation direction. The angle gain, compared to known devices, may be in the range of 10 to 25%.

The output beam of the optical device is defined as all the rays making it possible to obtain a light intensity greater than a predefined threshold, typically predefined by the regulations in force. This threshold is for example 1 cd, or 1.3 cd, or 1.5 cd. Other light rays may be emitted by the optical device, apart from this beam.

The present disclosure provides a particularly advantageous solution in the case where the output portion is located opposite the input portion, along the longitudinal direction, and potentially at a relatively large distance from the input portion. Indeed, such a longitudinally elongated configuration leads to a reduction in the proportion of the rays emitted by the light source(s) which, after having propagated in the optical device, are emitted by the output face. Thanks to the ogive shape, a greater part of the extreme rays of the beam propagating in the optical device may be collected and emitted by the output face. By "extreme rays of the beam" we mean the lateral bands of the beam seen in a plane orthogonal to the elevation direction.

However, arranging the light sources opposite the output portion in the direction of propagation of the light rays is an interesting implementation insofar as it makes it possible to limit the location of the electronic circuits to the input portion. In addition to the resulting simplification, this also makes it possible to free the other portions of the optical device so as not to hinder the transmission of light. Since it offers a technical improvement applicable to this type of advantageous implementation, the present disclosure is of even greater interest.

The optical device according to the present disclosure makes it possible to carry out a light signal lamp which respects the regulatory constraints in terms of angle of the beam emitted at the output, and this with more freedom on other characteristics of the lamp, such as the relative arrangement of certain components (such as the position of the light sources relative to the optical device) or the overall structure (dimensions of the lamp, general aesthetics, systems for connecting to the vehicle).

By "ogive", we mean a shape which, seen in the elevation direction, has edges forming arcs, that is to say non-rectilinear edges, which converge towards each other towards one end, possibly rounded. The lateral faces of the or of each module may define a shape similar to that of an ogive window.

By "module", we mean an unit element allowing, by combination with other elements, to constitute a set. In the present case, the module(s) constitute a set which may be a part of the output portion or form the entire output portion. According to the properties of the light beam that it is desired to obtain at the output of the optical device, the modules may be identical, substantially identical, or different. It is also possible for the output portion to comprise—or be made up of—a single module.

It should be noted that the term "module" is used in order to facilitate the geometric description of the optical device, but does not imply that this device necessarily comprises several modules, nor that it is formed of distinct elements assembled together. Thus, the optical device may advantageously be carried out in one piece, for example by molding.

In a possible implementation of the lamp including the optical device, in the mounted position on a vehicle, the longitudinal and transverse directions may be substantially horizontal, the elevation direction then being substantially vertical. With reference to the vehicle, the input portion of the optical device may be located at the rear of the output portion, the light beam therefore exiting from the lamp towards the front. The module may extend generally in a horizontal plane, or have a substantially horizontal mean plane.

According to one embodiment, the lateral faces of the module are located in the extension of the lateral faces of the middle portion. In other words, each lateral face of the module is substantially tangent to the corresponding lateral face of the middle portion. There is therefore no lateral dropout.

The lateral faces of the module may be provided to be substantially orthogonal to a plane parallel to the longitudinal and transverse directions.

According to one possible embodiment, the module:
has an upper face and/or a lower face extending substantially in a plane orthogonal to the elevation direction;
and/or has a mean plane which is substantially orthogonal to the elevation direction.

The or each module may have the shape of a thin wafer (compared to its longitudinal dimension), having substantially parallel upper and lower faces, the wafer extending generally in a plane orthogonal to the elevation direction.

The output portion of the optical device may comprise a plurality of modules arranged on top of each other in the elevation direction.

The front ridge of each module, which may not be rectilinear but rounded, defines a mean line. According to one possible embodiment, at least two modules have front ridges whose mean lines have different inclinations relative to the elevation direction. Such an arrangement makes it possible to direct the rays emitted by the optical device in different directions, in the plane of the front ridge.

It can be expected that, with the exception of the inclination of their front ridge, all the modules are identical.

For example, the optical device comprises at least 3, 5 or 7 superimposed modules.

According to one possible embodiment, along the elevation direction, the inclination of the mean line of the front ridge of the successive modules varies monotonically. Thus, for example, the angle that the mean line of a front ridge makes with the elevation direction only decreases when we consider the successive modules along the elevation direction, in a given direction. It should be noted that the angle is understood to comprise its absolute value but also its sign, which represents the direction of inclination relative to the elevation direction. Thus, a decrease in the angle may result in a reversal of the direction of inclination.

According to one possible embodiment, the output portion comprises at least three modules arranged on top of each other and, with reference to the elevation direction:
a module at one end has a front ridge inclined opposite the input portion;
a middle module has a front ridge substantially parallel to the elevation direction;
and a module at the other end has a front ridge inclined towards the input portion.

It can be expected that the front ridges of the modules arranged on top of each other are offset relative to each other along the longitudinal direction. Preferably, with reference to the elevation direction, from a module at one end to the module at the other end, the front ridges are increasingly offset towards the input portion. The output portion of the optical device may thus form a succession of steps.

In addition to the aesthetic aspect, and in particular the obtaining of a bulging profile which can match the shape of a lamp cover, such an offset makes it possible to increase the illuminated area of the space located laterally to the optical device. On the other hand, preferably, the front ridges of the modules are not offset transversely relative to each other.

The lateral faces of the middle portion may comprise reliefs arranged recessed or protruding, allowing the emission of light rays from these lateral faces. In fact, such reliefs constitute surface irregularities in certain places, which prevent the total reflection of the light rays in these places. As a result, light rays are transmitted locally by the lateral faces of the middle portion.

The optical device therefore appears side illuminated, which provides an aesthetic effect in addition to the regulatory illuminating effect obtained via the output portion. These two functions are obtained with a single optical device but also a single electrical connection system and a single mechanical connection system, which is very advantageous.

The lateral faces of the middle portion may be substantially parallel to each other and orthogonal to the transverse direction, that is to say located in a plane parallel to the longitudinal and elevation directions.

The input portion may include at least one collimator which is intended to be placed facing a light source, and which is configured to collect the rays emitted by said light source and orient them substantially parallel to the longitudinal direction. Preferably, the collimator is integrated, that is to say it is part of the block forming the optical device.

According to a second aspect, the present disclosure concerns a light signal lamp for a vehicle, comprising at least one optical device as previously described and a housing receiving said optical device. The housing includes a base provided with means or a mounting for mechanical assembling to the vehicle and a transparent or translucent cover mounted on the base and disposed facing at least the output portion of the optical device. The lamp further comprises at least one light source placed facing the input portion of the optical device. Several optical devices may be arranged in the lamp transversely adjacent.

According to a third aspect, the present disclosure concerns a vehicle, such as a truck or another industrial vehicle, comprising a tractor having a roof, and further comprising at least one light signal lamp as described above. The lamp is preferably mounted on the roof of the tractor and forms an outline marker lamp.

BRIEF DESCRIPTION OF THE DRAWINGS

We now describe, by way of non-limiting examples, several possible embodiments of the present disclosure, with reference to the appended figures.

DETAILED DESCRIPTION

Figure 1:
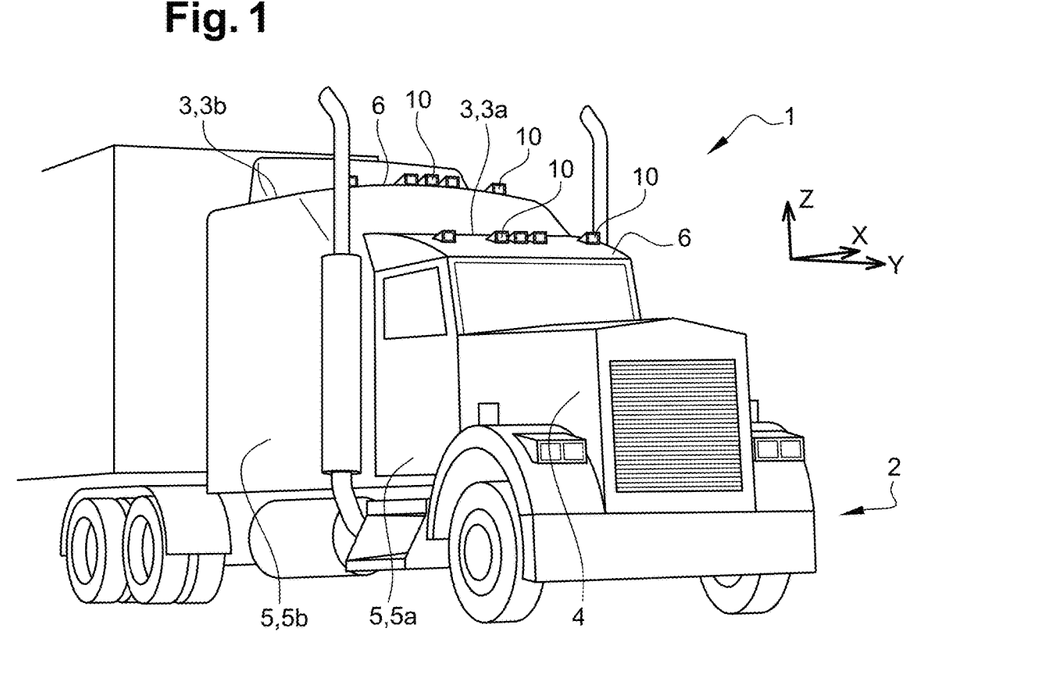
FIG. 1 is a perspective view of a vehicle including several signal lamps according to the present disclosure.

FIG. 1 represents a vehicle 1, which here is a truck. The vehicle 1 comprises a tractor 2 having a roof 3 and including a section 4 receiving the engine as well as a cabin 5.

The cabin 5 may include a forward compartment 5a, typically used when driving, and a back compartment 5b, which may correspond to a resting place for the driver of the vehicle 1. The roof 3 includes a forward part 3a above the forward compartment 5a and a back part 3b above the back compartment 5b, which may be higher than the forward part 3a.

In the represented example, the vehicle 1 is an American type truck, where the cabin 5 is located behind the section 4 receiving the engine.

The vehicle 1 comprises at least one light signal lamp 10 which forms for example an outline marker lamp, also called clearance lamp or forward identification lamp. The lamp 10 is here mounted on the roof 3. More specifically, both the forward part 3a and the back part 3b of the roof 3 may include several lamps 10, preferably mounted adjacent to the forward edge 6 of said part 3a, 3b without extending beyond, towards the front, of said forward edge 6. According to the illustrated non-limiting arrangement, each of the forward 3a and back 3b parts of the roof 3 includes a lamp 10 at each lateral end of the forward edge 6 and one or more lamps 10 (here three lamps 10) in the central part of the forward edge 6.

Figure 2:
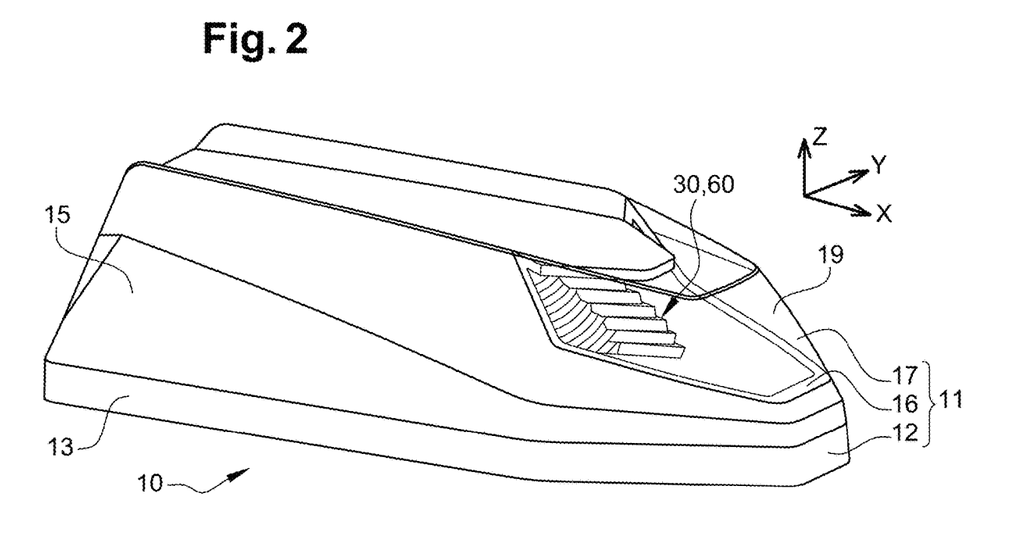
FIG. 2 is a perspective view of a signal lamp according to one embodiment of the present disclosure.
Figure 3:
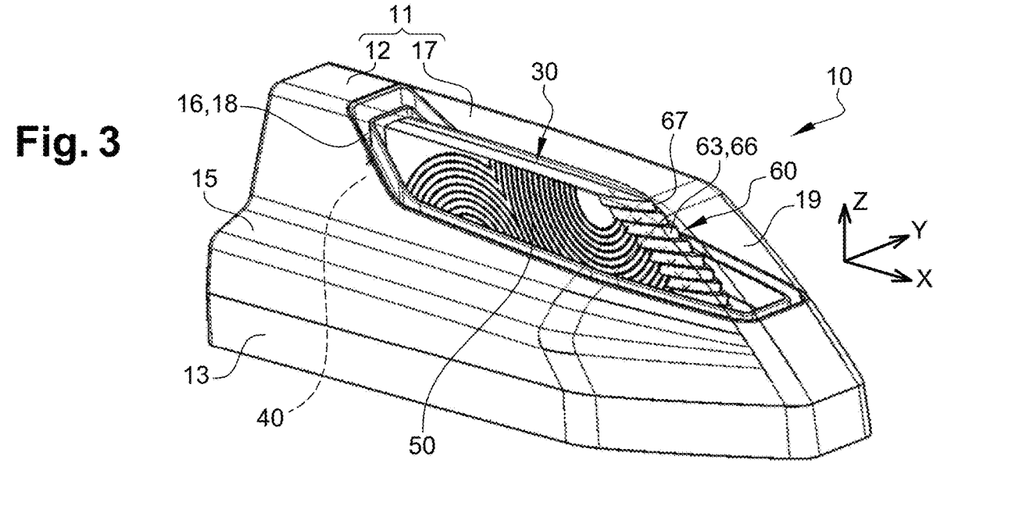
FIG. 3 is a perspective view of a signal lamp according to another embodiment of the present disclosure.

The light signal lamp 10, two embodiments of which are represented in FIGS. 2 and 3, comprises a housing 11 defining a closed volume in which at least one optical device 30 is housed. The housing 11 comprises a base 12 which is generally opaque, and a transparent or translucent cover 17 mounted on the base 12, for example by clipping and/or gluing. The cover 17 may be colorless or amber, for example. It may have a forward face 19 inclined towards the front and towards the stand 13.

Figure 4:
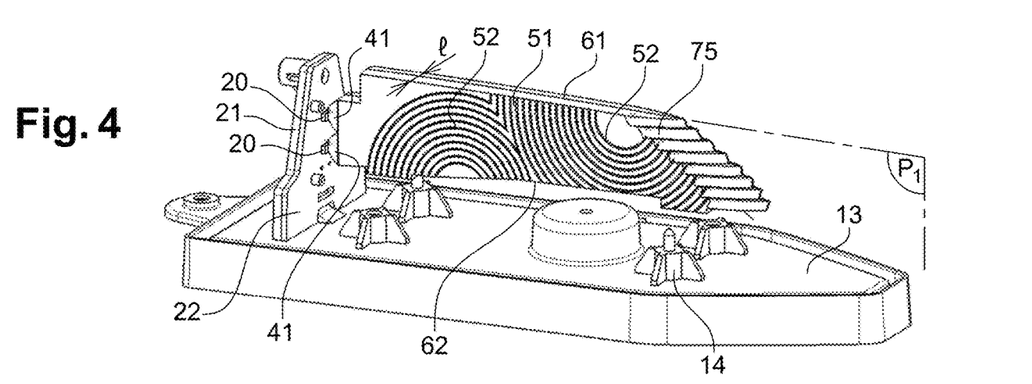
FIG. 4 is a partial perspective view of the lamp of FIG. 3, showing an optical device according to one embodiment of the present disclosure.

The base 12 may include a stand 13 provided with means or mounting for mechanical assembling to the vehicle 1. As illustrated in FIG. 4, these means or mounting may include threaded sleeves 14 allowing the lamp 10 to be screwed onto a wall of the vehicle 1. The stand 13 may be generally flat. The base 12 may also include a peripheral wall 15 assembled to the stand 13 and defining an opening bordered by a groove 16 in which a peripheral rim 18 of the cover 17 engages. The peripheral wall 15 may extend not only to the periphery of the stand 13, but also on a portion of the lamp 10 which is opposite the stand 13.

As seen in particular in FIG. 4, the optical device 30 is in the form of a block of transparent or translucent material. The optical device 30 may be in one piece. It may be obtained by molding a single piece. The optical device 30 may be made of plastic, for example PMMA (poly methyl methacrylate). Alternatively, it could be made of highly transparent quality PC (polycarbonate).

The optical device 30 has a longitudinal direction X and comprises, along this longitudinal direction X:
an input portion 40 configured to receive rays emitted by at least one light source 20;
a middle portion 50 having two lateral faces 51 spaced from each other along a transverse direction Y orthogonal to the longitudinal direction X;
an output portion 60 including an output face 75 through which the rays which have propagated in the optical device 30 are emitted.

We further define an elevation direction Z as the direction orthogonal to the longitudinal X and transverse Y directions.

The optical device 30 is mounted in the housing 11 so that the elevation direction Z is substantially orthogonal to the stand 13. The housing 11 preferably has a shape generally corresponding to that of the optical device 30, and has the same longitudinal X and transversal Y directions.

In the exemplary embodiment illustrated in FIG. 1, the lamps 10 are mounted on the vehicle so that the elevation direction Z is substantially vertical, the longitudinal direction X corresponds to the longitudinal direction of the vehicle 1, and the transverse direction Y corresponds to the transverse direction of vehicle 1. The directions X and Y are therefore horizontal and orthogonal to each other. The lamps 10 are thus designed to provide a lighting at least towards the front, through the output face 75 of the output portion 60 of the optical device 30.

This arrangement is not restrictive and, in the mounted position, the lamp 10 could have a different spatial positioning.

However, for simplification purposes, the description is performed with this orientation in space. The terms "length", "forward", "back" are used relative to the longitudinal direction X, the terms "width", "lateral" are used relative to the transverse direction Y, and the terms "height", "upper", "lower" are used relative to the elevation direction Z.

The cover 17 is arranged facing at least the output portion 60 of the optical device 30, so that the light rays may be emitted towards the outside of the lamp 10. The cover 17 is preferably arranged both in front of the output portion 60 and laterally to the latter. However, it is not necessarily placed facing the entire output face 75.

The cover 17 may be located only facing the output portion 60 of the optical device 30, as in the embodiment illustrated on FIG. 2, where the peripheral wall 15 covers a back part of the lamp 10. Alternatively, the cover 17 may also be facing the lateral faces 51 of the middle portion 50 of the optical device 30, as in the embodiment illustrated on FIG. 3. According to another envisaged variant, but not represented, the cover 17 could extend over substantially the entire length of the optical device 30 or of the housing 11.

The lamp 10 further comprises at least one light source 20, such as a LED, placed facing the input portion 40 of the optical device 30. For example, two light sources 20 may be provided.

According to one possible embodiment, the housing 11 comprises a support 21 which may be in the form of a plate secured to the stand 13 and arranged orthogonally to the longitudinal direction X. The light sources 20 are mounted on an electronic card 22 itself fastened to the support 21. The light sources 20 may be placed in alignment along the elevation direction Z.

The optical device 30 may have a symmetry plane P1 which extends in a plane (X, Z), that is to say a vertical longitudinal symmetry plane. In certain variants, such as those illustrated on FIGS. 16 and 17, at least the output portion 60 of the optical device 30 may also have a symmetry plane P2 which extends in a plane (Y, Z), that is to say a horizontal symmetry plane.

The optical device 30 has an upper face 61 and a lower face 62.

The optical device 30 may generally have the shape of a narrow parallelepiped (that is to say of small dimension in the transverse direction Y) and elongated in the longitudinal direction X. For example, the ratio of the length L of the device optical 30 to its width 1 may be in the range of 7 to 11. The length L may be in the range of 8 to 12 cm. The width 1 may be in the range of 8 to 10 mm. Furthermore, the height h of the optical device 30 may be in the range of 2 to 5 cm.

Figure 5:
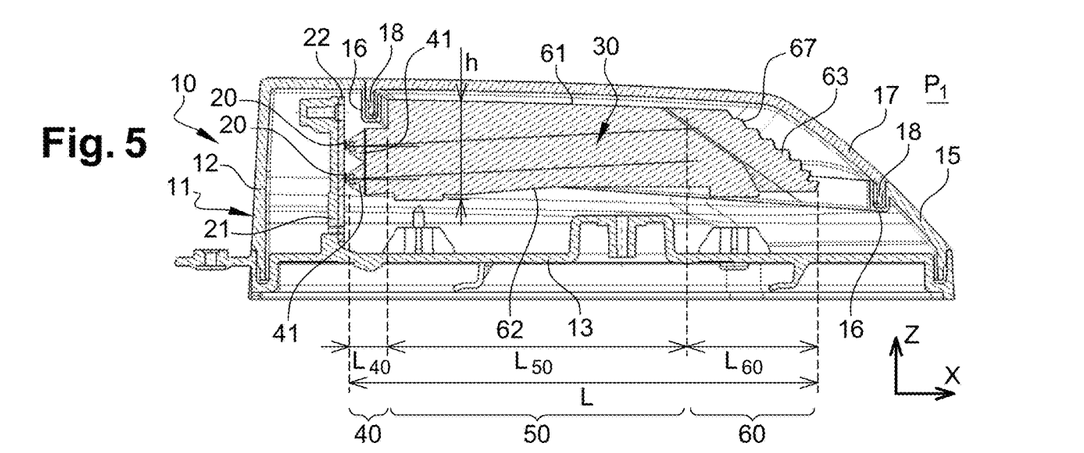
FIG. 5 is a vertical longitudinal sectional view of the lamp of FIG. 3.

As an example, and as represented in FIG. 5:
the length L40 of the input portion 40 may be in the range of 5 to 10% of the length L of the optical device 30;
the length L50 of the middle portion 50 may be in the range of 50 to 75% of the length L of the optical device 30; and
the length L60 of the output portion 60 may be in the range of 20 to 35% of the length L of the optical device 30.

The optical device 30 may be fastened on the stand 13 of the housing 11 by any appropriate means or fastener, for example by screwing a fastening tab secured to said optical device 30.

It may be envisaged that the lamp 10 includes several optical devices 30, which may be identical, and which may be arranged parallel and adjacent, or even superimposed, along the transverse direction Y.

Figure 13:
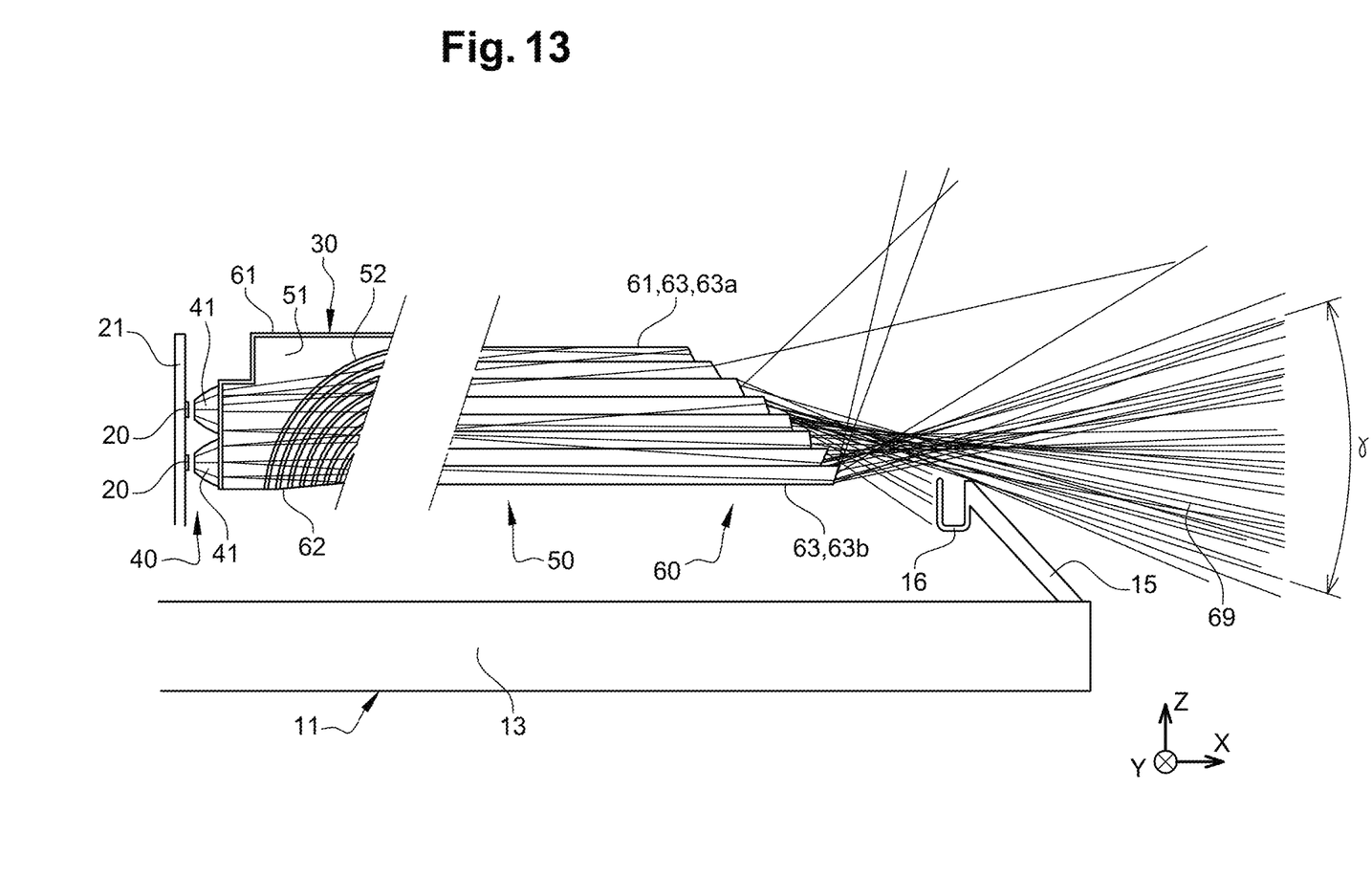
FIG. 13 is a partial lateral view of the lamp of FIG. 3, showing the path of the light rays.

The input portion 40 of the optical device 30 may include a collimator 41 facing each of the light sources 20, that is to say two collimators in the represented exemplary embodiment. Each collimator 41 is configured to collect the rays emitted by the corresponding light source 20 and orient them substantially parallel to the longitudinal direction X, as seen in FIG. 13. By "substantially parallel", we mean that these rays form with the longitudinal direction X an angle less than 10°, or even less than 5°.

The light rays then propagate inside the middle portion 50 of the optical device 30.

Preferably, the lateral faces 51 of the middle portion 50 are substantially parallel to each other and orthogonal to the transverse direction X. Thus, the majority of the light rays follow a longitudinal trajectory in this middle portion 50.

However, there are light rays which are not oriented longitudinally, and therefore intersect at least one of the lateral faces 51. It may be envisaged that these lateral faces 51 comprise reliefs 52 arranged recessed or protruding, which create local surface irregularities and thus lead to the emission of light rays from these lateral faces 51. It follows that, in operation, the middle portion 50 of the optical device 30 is illuminated, which improves the visibility of the lamp 10 as well as its aesthetic. In the represented non-limiting example, the reliefs 52 include ribs forming concentric circle portions.

The rays having propagated substantially longitudinally in the middle portion 50 form a beam 62 which enters the output portion 60.

Figure 7:
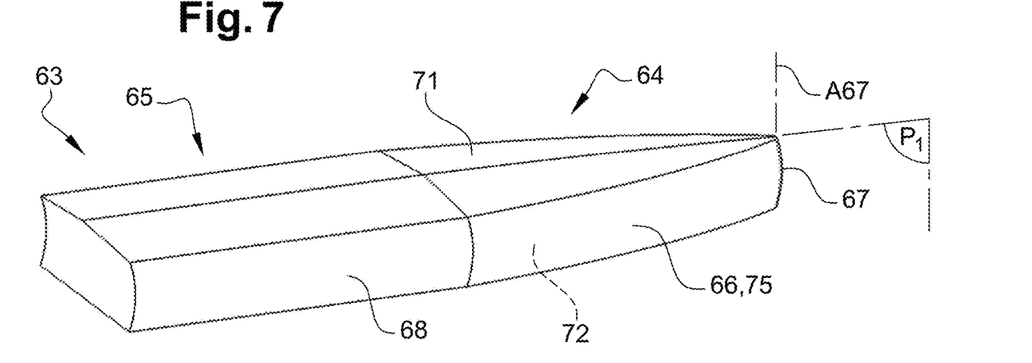
FIG. 7 is a perspective view of a module belonging to the output portion of the optical device.
Figure 8:
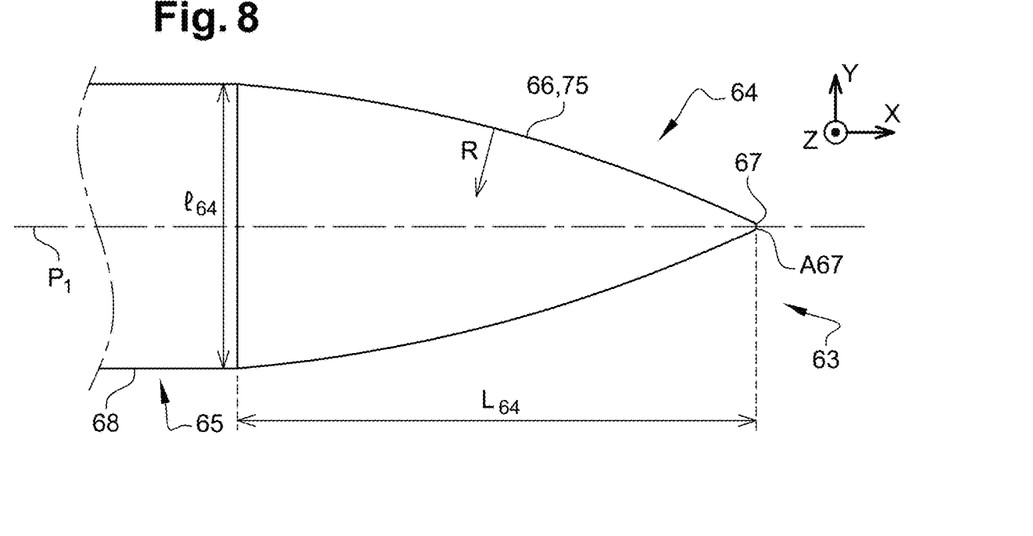
FIG. 8 is a top view of the module of FIG. 7.

The output portion 60 comprises or is formed of one or more modules 63, an example of which is illustrated on FIGS. 7 and 8.

The module 63 includes a forward portion 64 and may further include a back portion 65 located between this forward portion 64 and the middle portion 50 of the optical device 30. The forward portion 64 has lateral faces 66 which, when viewed in the elevation direction Z, have an ogive shape.

In addition, these lateral faces 66 define a front ridge 67 which extends substantially in a plane parallel to the longitudinal X and elevation Z directions, here in the plane P1. The front ridge 67 defines a mean line A67, as illustrated on FIGS. 7 and 8. The front ridge 67 may have a rounded shape, seen in the transverse direction Y.

With reference to FIG. 8, and as an example, the ogive shape of the forward portion 64 may have the following geometric characteristics:
the ratio of the length L64 to the width 164 may be in the range of 1.4 to 2;
the radius of curvature R of a lateral face 66 may be approximately 20 to 30 mm in the vicinity of the front ridge 67 and approximately 35 to 55 mm in the middle of the lateral face 66—in the longitudinal direction X.

The back portion 65 (when present) has lateral faces 68 which are substantially parallel to each other and orthogonal to the transverse direction Y. The lateral faces 68 may include reliefs 52.

The lateral faces of the module 63 are preferably substantially orthogonal to a plane parallel to the longitudinal X and transverse Y directions, that is to say here to a horizontal plane.

Furthermore, the lateral faces of the module 63 are preferably located in the extension of the lateral faces 51 of the middle portion 50 of the optical device 30. According to this arrangement, in concrete terms, when the module 63 includes a back portion 65, the lateral faces 68 thereof are located in the same plane as the lateral faces 51 of the middle portion 50 and the lateral faces 66 of the forward portion 64 of the module 63 are located in the extension of the lateral faces 68 of the back portion 65, that is to say tangentially without Y offset, as illustrated on FIGS. 7 and 8. When the module 63 includes only a forward portion 64, and no back portion 65, the lateral faces 66 of the forward portion 64 are located in the extension of the lateral faces 51 of the middle portion 50, that is to say tangentially without Y offset.

Figure 9:
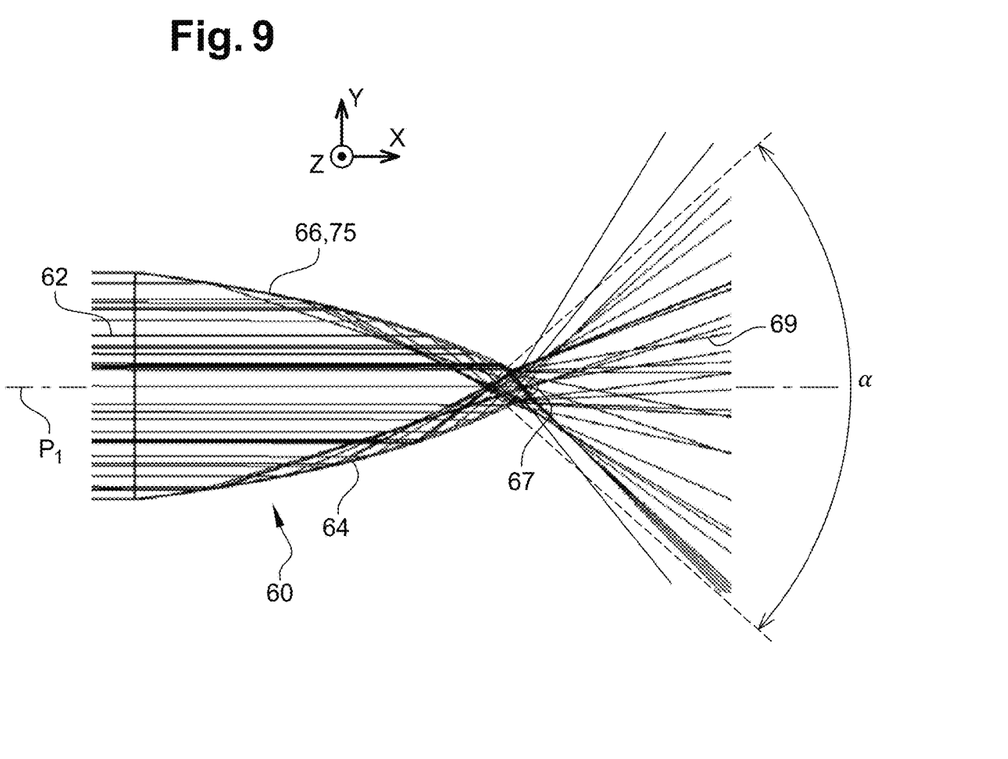
FIG. 9 is a view similar to FIG. 8, where the path of the light rays is represented.

FIG. 9 illustrates the path of the light rays emitted at the output of the output portion 60 of the optical device 30, seen in a horizontal plane (X, Y). Due to the ogive shape:
a light ray propagating longitudinally in the beam 62 in the vicinity of the plane P1 arrives on the lateral face 66 which it meets with an angle of incidence sufficiently low to be transmitted to the external environment;

the further one moves away from the plane P1, in the transverse direction Y, the more the angle of incidence of a light ray of the beam 62 increases, up to the limit angle allowing the transmission through the output face 75;

beyond this limit, a light ray from the beam 62 first undergoes a total reflection on the lateral face 66 which it meets then arrives on the opposite lateral face 66 with an angle of incidence which is then sufficiently low so that this ray may be transmitted via the output face to be emitted into the external environment to the optical device 30.

Thus, a large majority of the light rays of the beam 62 are ultimately emitted into the external environment. It follows that the angle α of the beam 69 emitted at the output of the optical device 30 into the external environment, in a plane (X,Y) is relatively large. This angle α is for example in the range of 90°, that is to say that the rays of the beam 69 make an angle of up to 45° in one direction and in the other relative to the plane P1. Beyond this cone of angle a, certain rays may still be emitted, but the resulting light intensity is lower.

The beam 69 at the output of the optical device is defined as all the rays making it possible to obtain a light intensity greater than a predefined threshold, typically predefined by the regulations in force. This threshold is for example 1 cd, or 1.3 cd, or 1.5 cd. Other light rays may be emitted by the optical device, apart from this beam.

As seen on FIG. 7, the module 63 may have the shape of a thin wafer having upper 71 and lower 72 faces that are substantially parallel and horizontal.

Figure 6:
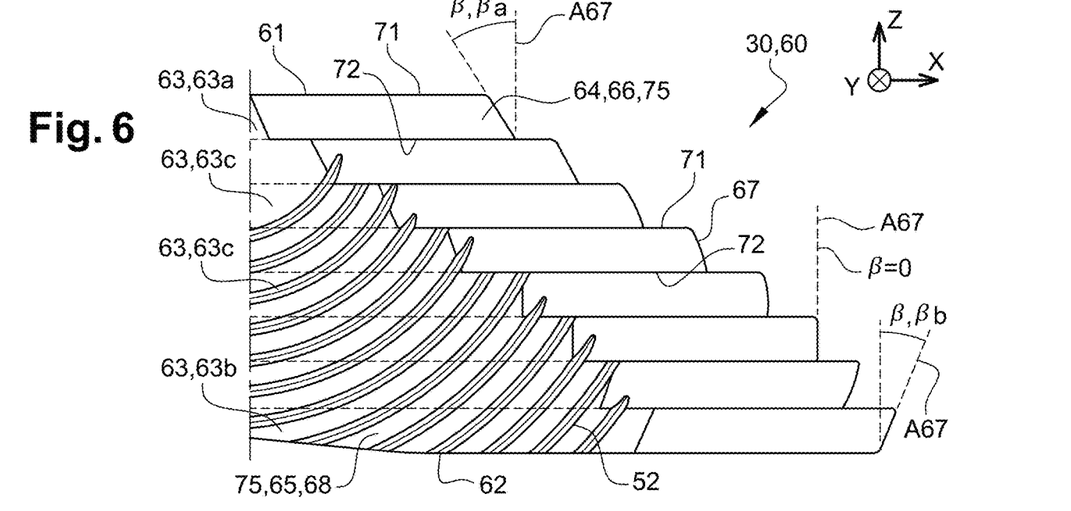
FIG. 6 is a lateral view of the output portion of the optical device of FIG. 4.

According to one embodiment, as illustrated on FIGS. 4 to 6, the output portion 60 of the optical device 30 comprises a plurality of modules 63 arranged on top of each other in the elevation direction Z. We thus have an upper module 63a, a lower module 63b, and preferably at least one intermediate module 63c. In the represented embodiment, there are eight modules 63 arranged on top of each other, this being only an example.

Preferably, the front ridges 67 of the modules 63 are not rectilinear but have a curved profile, for example slightly bulging towards the front, so that, for a given module 63, the rays emitted are not parallel to each other.

The mean line A67 of the front ridge 67 of a given module 63 has an angle of inclination β relative to the elevation direction Z, in a plane parallel to (X, Z).

According to one embodiment, all the front ridges 67 do not have the same angle β. Such an arrangement makes it possible to control the angle of the light beam emitted, in a plane (X, Z), module by module, that is to say stage by stage of the optical device 30. It should be noted that the angle β is defined by its absolute value and its sign; thus different angles β may vary by their absolute value and/or by their sign, that is to say their direction of inclination relative to the elevation direction Z.

The inclination β may vary monotonically from the upper module 63a to the lower module 63b. This makes it possible to obtain a certain homogenization of the visible light intensity at the output of the lamp 10.

In the embodiment of FIG. 6, the mean line A67 of the front ridge 67 of the lower module 63b is inclined from bottom to top opposite the input portion 40. With this orientation the angle β is defined as being positive. For example, the angle Bb for the lower module 63b may be in the range of +20°.

Considering the successive modules in the elevation direction Z up to the upper module 63a, the angle β only decreases. First of all, the angle β decreases until it is substantially zero for one or more intermediate modules 63c located in the middle part—in the elevation direction Z—of the output portion 60. Then, the angle β decreases again, becoming negative while its absolute value increases. Thus, the mean line A67 of the front ridge 67 of the upper module 63a is inclined from bottom to top towards the input portion 40. For example, the angle Ba for the upper module 63a may be in the range of −30°.

Figure 10:
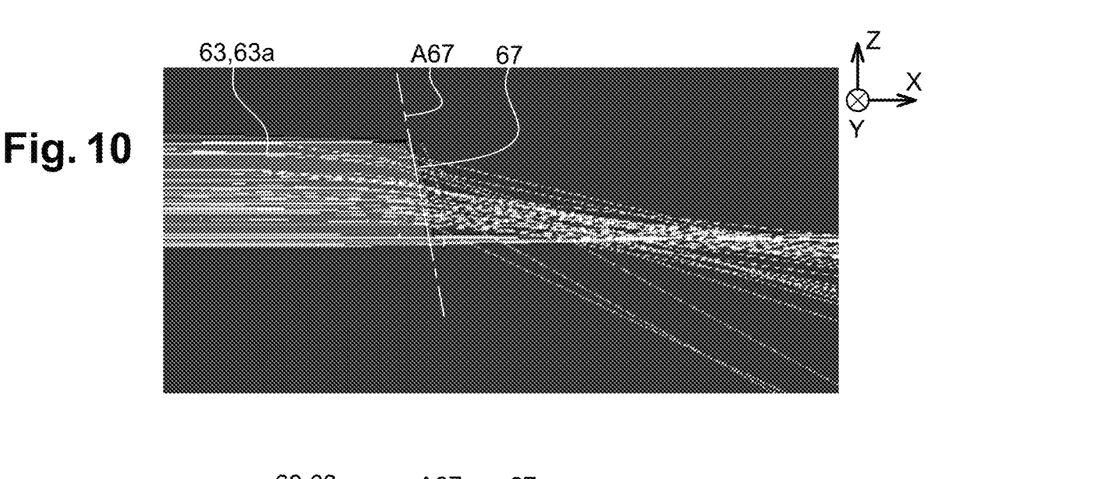
FIG. 10 is a lateral view of a module according to one embodiment, showing the path of the light rays.
Figure 11:
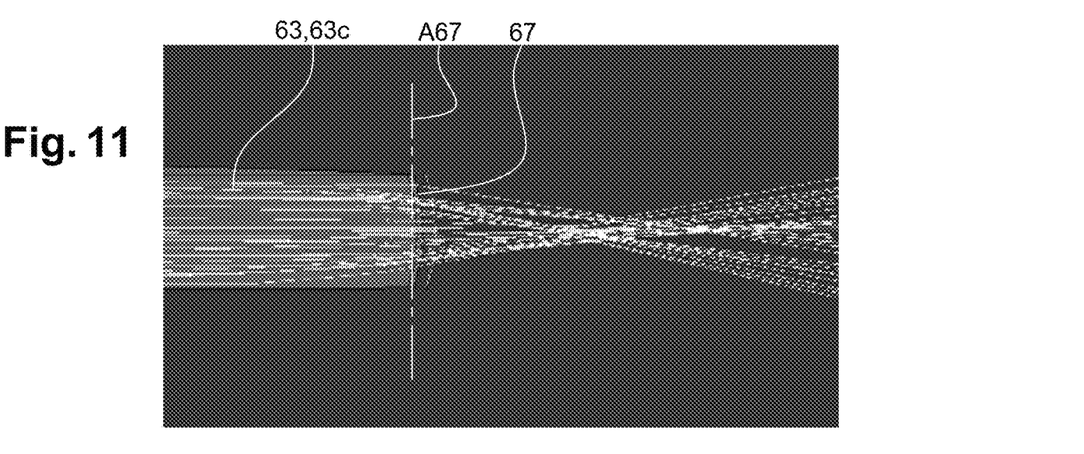
FIG. 11 is a lateral view of a module according to another embodiment, showing the path of the light rays.
Figure 12:
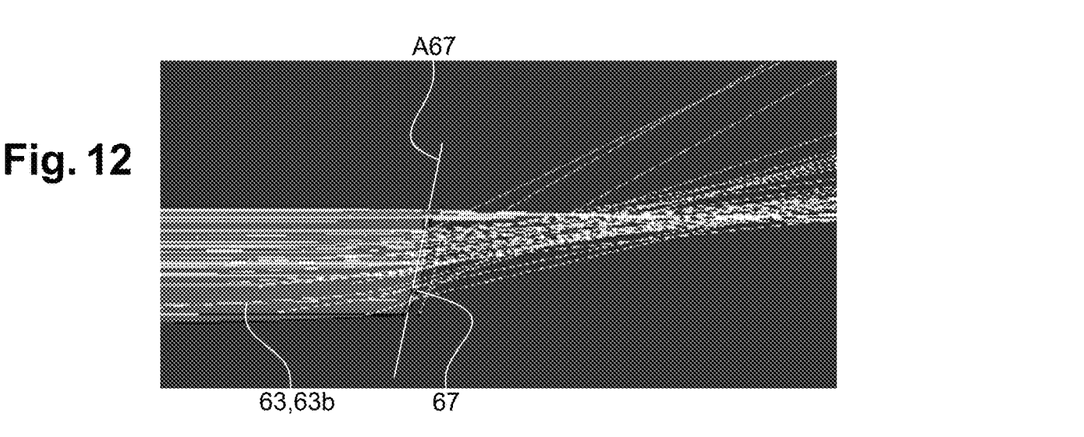
FIG. 12 is a lateral view of a module according to yet another embodiment, showing the path of the light rays.

With this arrangement, in a plane (X, Z):
the beam emitted by the upper module 63a is directed downwards (FIG. 10);
the beam emitted by an intermediate module 63c for which β=0 is substantially of longitudinal axis (FIG. 11); and
the beam emitted by the lower module 63b is directed upwards (FIG. 12).

Overall, the beam emitted by the optical device 30 via the output face 75 of the output portion 60 corresponds to all of the beams emitted by each of the modules 63 forming this output portion 60. As can be seen on the FIG. 13, the beam 69 emitted at the output of the optical device 30 in the external environment has, in a plane (X, Z), an angle γ of at least 15° in one direction and in the other relative to the longitudinal direction X. Beyond this cone of angle γ, certain rays may still be emitted, but the resulting light intensity is lower.

For reasons of feasibility or aesthetics, as illustrated on FIG. 13, the cover 17 of the housing 11 is not necessarily placed facing the entire output face 75 of the optical device 30. Thus, part of the output face 75 may be facing the base 12. In the illustrated example, the base 12, more precisely the peripheral wall 15, is facing, at least in the longitudinal direction X, at least the lower module 63b. It should be noted that the cover 17 is not represented.

With an opaque base 2, the path of the rays emitted via the output face 75 is therefore locally obstructed. The aforementioned orientation of the mean line A67 of the front ridge 67 of the modules 63 makes it possible to overcome this problem. Indeed, since the beam emitted by the lower module 63b is directed upwards, it may pass higher than the opening defined by the peripheral wall 15 and therefore pass through the cover 17. In addition, the beam emitted by the upper module 63a being directed downwards, it makes it possible to compensate for the deficit in light intensity in the lower part of the lamp 10, due to the presence of an opaque part facing the lower module 63b.

Figure 14:
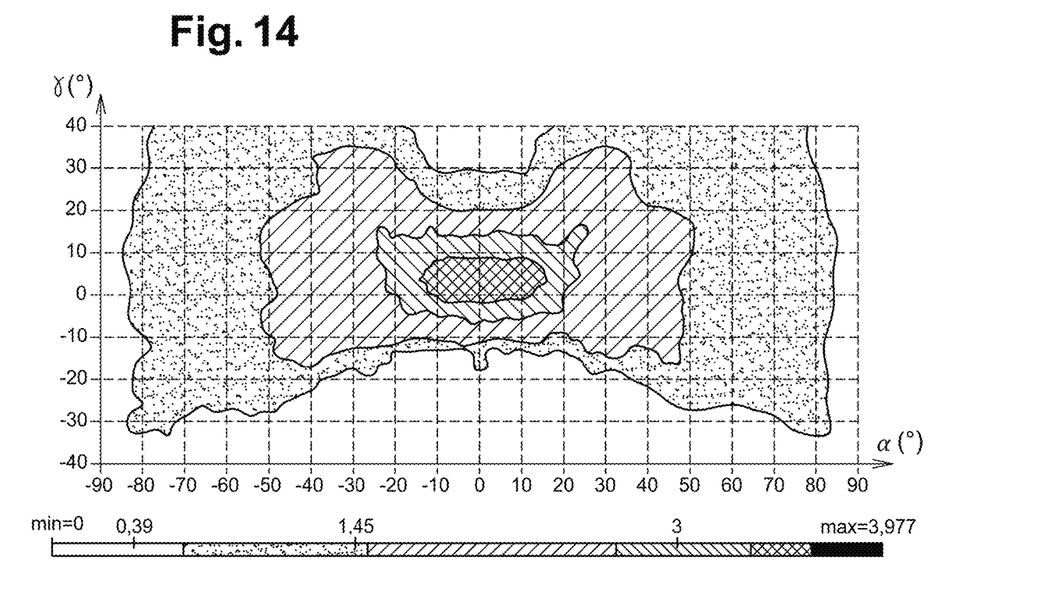
FIG. 14 is a schematic representation of the light areas obtained at the output of the optical device.

FIG. 14 schematically illustrates the light areas obtained at the output of the optical device 30, when looking at the output portion 60 from front to rear. As can be seen, the present disclosure makes it possible to obtain an output light intensity greater than 1 cd, or even 1.3 or 1.5 cd, over an area extending:

horizontally, over a range of angles α going at least from −45° to +45°,
and, vertically, over a range of angles γ going at least from −15° to +15°.

Furthermore, in the embodiment illustrated on FIGS. 4 to 6, the front ridges 67 of the modules 63 arranged on top of each other are offset relative to each other along the longitudinal direction X. More specifically, we can expect that, from the lower module 63b towards the upper module 63a, the front ridges 67 are increasingly offset towards the input portion 40. The output portion 60 of the optical device 30 then has a front end having a profile generally curved and bulging, which may advantageously follow the shape of the cover 17 at its inclined forward face 19.

With this configuration, and as seen in FIG. 6, all the forward portions 64 of the modules 63 may be identical, while the back portions 65 of the modules 63 may be increasingly longer from the upper module 63a to the lower module 63b. According to one possible embodiment, the upper module 63a may be devoid of back portion 65.

It is specified that, in the embodiment illustrated on FIGS. 4 to 6, the term "module" is used to describe each degree of a stepped structure. It does not mean that the output portion 60 is formed of initially distinct elements stacked on top of each other and assembled together.

Figure 15:
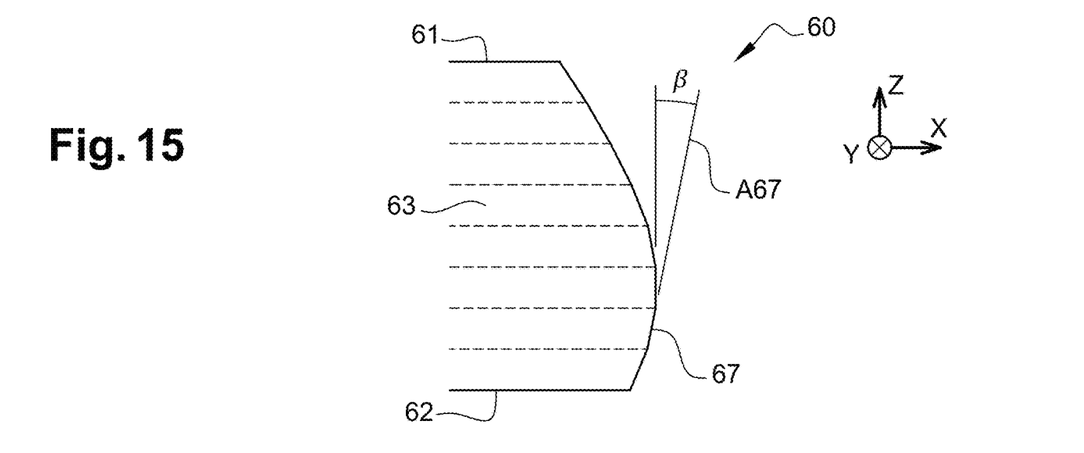
FIG. 15 is a lateral view of the output portion of an optical device according to one variant.
Figure 16:
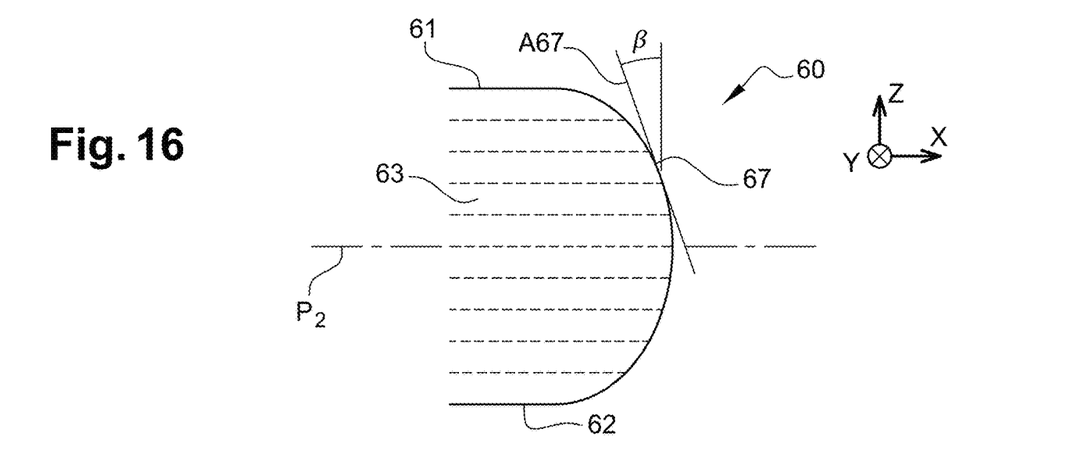
FIG. 16 is a lateral view of the output portion of an optical device according to another variant.
Figure 17:
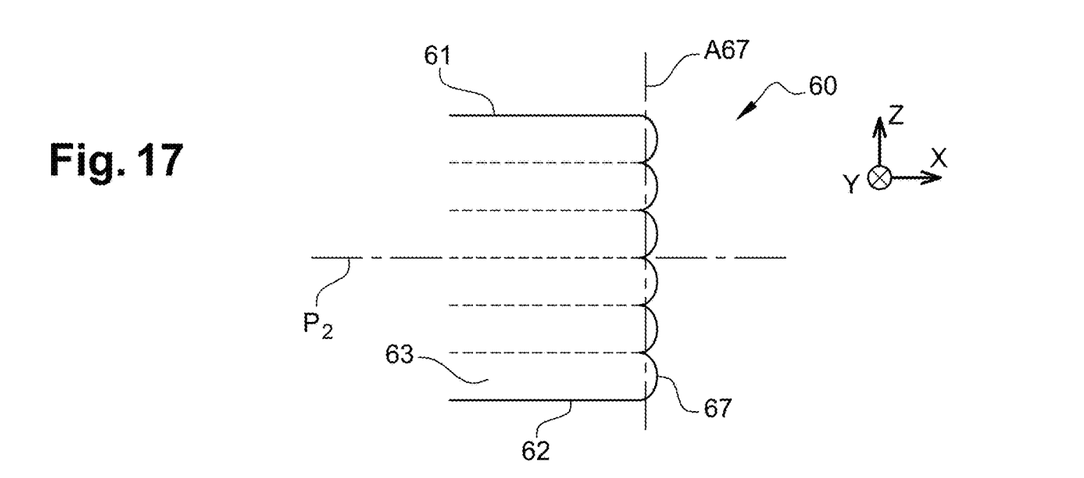
FIG. 17 is a lateral view of the output portion of an optical device according to yet another variant.

We now refer to FIGS. 15 to 17 which illustrate variants of the output portion 60 of the optical device 30. It is specified that, for all these variants, the lateral faces of the output portion 60 of the or of each module 63 have an ogive shape when viewed in the elevation direction Z. The variants differ by the shape of their overall front ridge—that is to say all of the front ridges 67 of the modules 63 of the output portion 60 of the optical device 30, this making it possible to obtain different light distributions at the output, in a plane (X, Z).

The output portion 60 of FIG. 15 corresponds to that of FIG. 6 in a configuration where the front ridges 67 of the modules 63 arranged on top of each other are not offset relative to each other along the longitudinal direction X. In other words, one end of a given front ridge 67 coincides with one end of the adjacent front ridge 67. Thus, unlike FIG. 6 where steps are formed, in FIG. 15 there appears no visible delimitation between the modules 63, except the local changes in the angle of inclination β. The dotted lines on FIG. 15 correspond to the limits between two successive modules 63, it being remembered that the use of the term "module" aims to simplify the description, but that the optical device 30 is preferably made in one piece.

In the variant illustrated on FIG. 16, instead of varying by segments as on FIG. 15, all of the front ridges 67 of the successive modules 63 form a curve and not a broken line. For example, the output portion 60 may have an overall front ridge having a shape bulging towards the front, of the type of the shape of a converging lens face.

In the variant illustrated on FIG. 17, each of the modules 63 has a front ridge curved and bulging towards the front, of the type of the shape of a converging lens face. In the case represented where all the front ridges 67 have the same mean line A67, the modules 63 may be identical. Alternatively, the front ridges 67 of the modules 63 arranged on top of each other could be offset relative to each other along the longitudinal direction X, the modules 63 then being more or less long, in a manner similar to what has been described with reference to FIG. 6.

It goes without saying that the present disclosure is not limited to the embodiments described above by way of examples but that it comprises all the technical equivalents and variants of the means described as well as their combinations.

What is claimed is:

1. An optical device intended to be placed in a housing to form a light signal lamp for a vehicle, the optical device being in the form of a block of transparent or translucent material having a longitudinal direction and comprising, along the longitudinal direction:
    an input portion configured to receive rays emitted by at least one light source;
    a middle portion having two lateral faces spaced from each other along a transverse direction orthogonal to the longitudinal direction;
    an output portion including an output face through which the rays which have propagated in the optical device are emitted;
    an elevation direction being defined as orthogonal to the longitudinal and transverse directions;
    wherein the output portion comprises a plurality of modules, at least one module of the plurality of modules having lateral faces which, when viewed in the elevation direction, have an ogive shape and which define a front ridge extending substantially in a plane parallel to the longitudinal and elevation directions and the plurality of modules are arranged on top of each other in the elevation direction, the front ridge of each module of the plurality of modules defining a mean line, in which at least two modules of the plurality of modules have front ridges whose mean lines have different inclinations relative to the elevation direction.

2. The optical device according to claim 1, wherein the lateral faces of the at least one module are located in an extension of the two lateral faces of the middle portion.

3. The optical device according to claim 2, wherein the lateral faces of the at least one module are substantially orthogonal to a plane parallel to the longitudinal and transverse directions.

4. The optical device according to claim 3, wherein the at least one module:
    has an upper face and/or a lower face extending substantially in a plane orthogonal to the elevation direction;
    and/or has a mean plane which is substantially orthogonal to the elevation direction.

5. The optical device according to claim 4, wherein, along the elevation direction, an inclination of the mean line of the front ridge of successive modules of the plurality of modules varies monotonically.

6. The optical device according to claim 5, wherein the plurality of modules of the output portion comprises at least three modules arranged on top of each other, and wherein, with reference to the elevation direction the at least three modules comprise:
    a module at one end has a front ridge inclined opposite the input portion;
    a middle module has a front ridge substantially parallel to the elevation direction;
    and a module at an other end has a front ridge inclined towards the input portion.

7. The optical device according to claim 6, wherein the front ridges of the plurality of modules arranged on top of each other are offset relative to each other along the longitudinal direction, in which, with reference to the elevation direction, from a module at one end to the module at an other end, the front ridges are increasingly offset towards the input portion.

8. The optical device according to claim 7, wherein the two lateral faces of the middle portion comprise reliefs arranged recessed or protruding, allowing the emission of light rays by the two lateral faces.

9. The optical device according to claim 1, wherein the lateral faces of the at least one module are substantially orthogonal to a plane parallel to the longitudinal and transverse directions.

10. The optical device according to claim 1, wherein the at least one module:
    has an upper face and/or a lower face extending substantially in a plane orthogonal to the elevation direction;
    and/or has a mean plane which is substantially orthogonal to the elevation direction.

11. The optical device according to claim 1, wherein, along the elevation direction, an inclination of the mean line of the front ridge of successive modules of the plurality of modules varies monotonically.

12. The optical device according to claim 1, wherein the plurality of modules of the output portion comprises at least three modules arranged on top of each other, and wherein, with reference to the elevation direction the at least three modules comprise:
- a module at one end has a front ridge inclined opposite the input portion;
- a middle module has a front ridge substantially parallel to the elevation direction;
- and a module at an other end has a front ridge inclined towards the input portion.

13. The optical device according to claim 1, wherein the front ridges of the plurality of modules arranged on top of each other are offset relative to each other along the longitudinal direction, in which, with reference to the elevation direction, from a module at one end to the module at an other end, the front ridges are increasingly offset towards the input portion.

14. The optical device according to claim 1, wherein the two lateral faces of the middle portion comprise reliefs arranged recessed or protruding, allowing the emission of light rays by the two lateral faces.

15. The optical device according to claim 1, wherein the two lateral faces of the middle portion are substantially parallel to each other and orthogonal to the transverse direction.

16. The optical device according to claim 1, wherein the input portion includes at least one collimator which is intended to be placed facing a light source, and configured to collect the rays emitted by said light source and orient them substantially parallel to the longitudinal direction.

17. A light signal lamp for a vehicle, comprising at least one optical device, the at least one optical device being in the form of a block of transparent or translucent material having a longitudinal direction and comprising, along the longitudinal direction:
- an input portion configured to receive rays emitted by at least one light source;
- a middle portion having two lateral faces spaced from each other along a transverse direction orthogonal to the longitudinal direction;
- an output portion including an output face through which the rays which have propagated in the optical device are emitted;
- an elevation direction being defined as orthogonal to the longitudinal and transverse directions;
- wherein the output portion comprises at least one module having lateral faces which, when viewed in the elevation direction, have an ogive shape and which define a front ridge extending substantially in a plane parallel to the longitudinal and elevation directions a housing receiving the at least one optical device, the housing including a base provided with a mounting for mechanical assembling to the vehicle and a transparent or translucent cover mounted on the base and disposed facing at least the output portion of the at least one optical device, the light signal lamp further comprising at least one light source placed facing the input portion of the at least one optical device.

18. A vehicle, such as a truck or other industrial vehicle, comprising a tractor having a roof, wherein the vehicle further comprises at least one light signal lamp according to claim 17, the at least one light signal lamp being mounted on the roof of the tractor and forming an outline marker lamp.

19. An optical device intended to be placed in a housing to form a light signal lamp for a vehicle, the optical device being in the form of a block of transparent or translucent material having a longitudinal direction and comprising, along the longitudinal direction:
- an input portion configured to receive rays emitted by at least one light source;
- a middle portion having two lateral faces spaced from each other along a transverse direction orthogonal to the longitudinal direction;
- an output portion including an output face through which the rays which have propagated in the optical device are emitted;
- an elevation direction being defined as orthogonal to the longitudinal and transverse directions;
- wherein the output portion comprises at least one module having lateral faces which, when viewed in the elevation direction, have an ogive shape and which define a front ridge extending substantially in a plane parallel to the longitudinal and elevation directions and wherein the two lateral faces of the middle portion comprise reliefs arranged recessed or protruding, allowing the emission of light rays by the two lateral faces.

\* \* \* \* \*